3,367,388
THERMOSTATIC CONTROL DEVICE
Richard K. Mitts, Huntington Beach, Calif., assignor to Robertshaw Controls Company, Richmond, Va., a corporation of Delaware
Filed Mar. 31, 1966, Ser. No. 539,148
6 Claims. (Cl. 158—122)

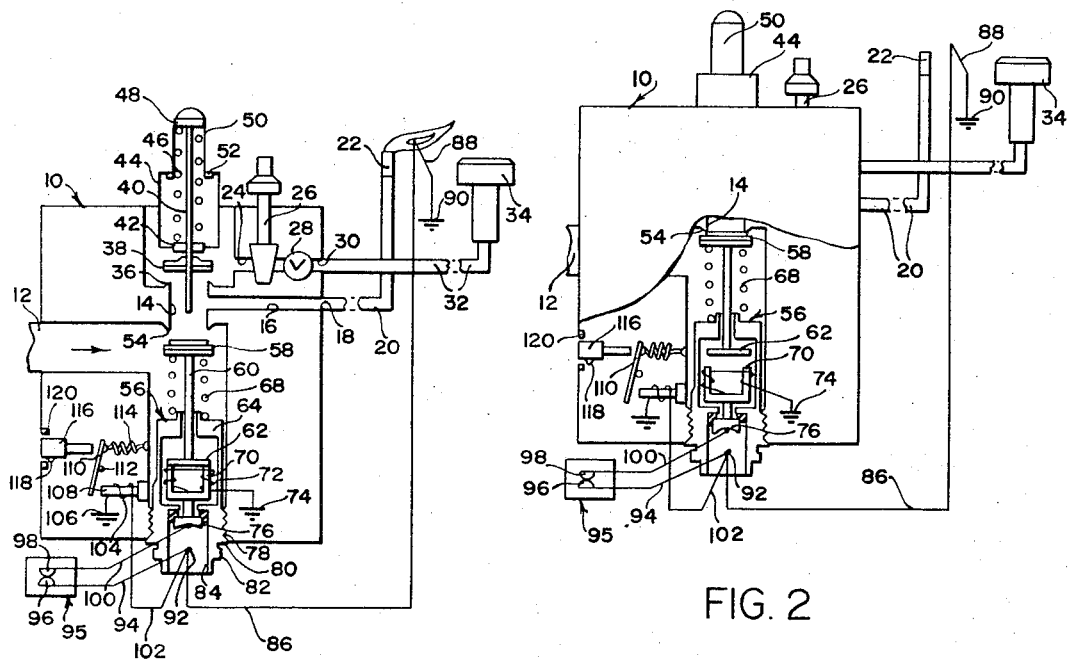
FIG. 1
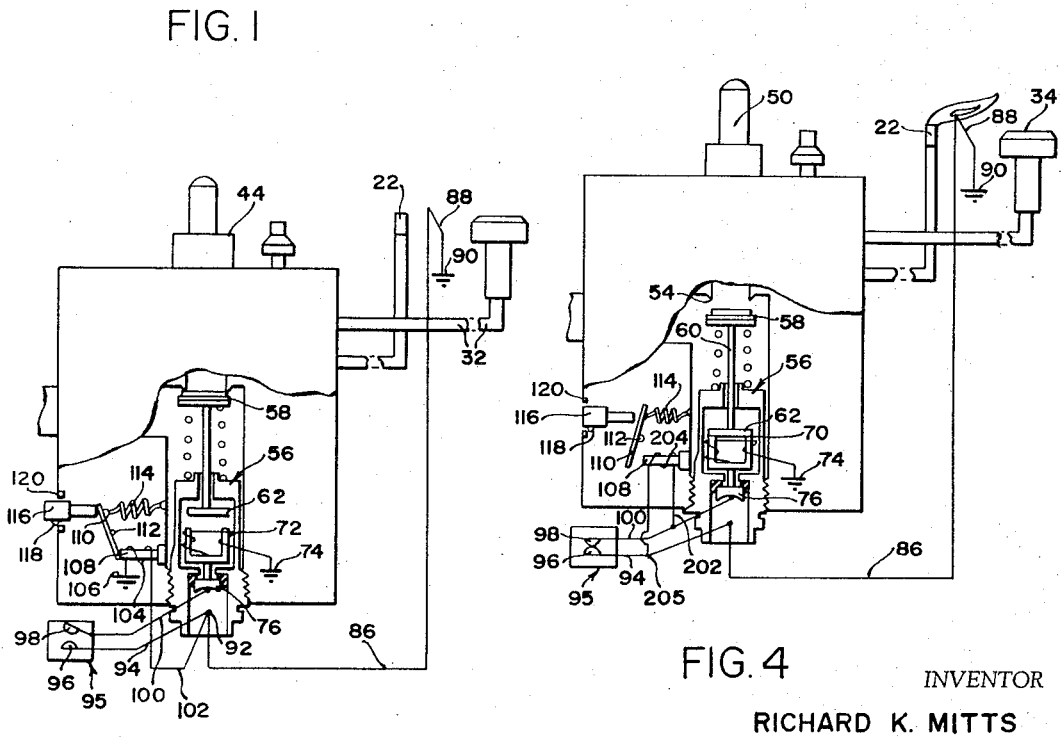
FIG. 3
FIG. 4
INVENTOR
RICHARD K. MITTS
BY Anthony A. O'Brien
ATTORNEY United States Patent Office 3,367,388
Patented Feb. 6, 1968

ABSTRACT OF THE DISCLOSURE

A control system for main and pilot burner apparatus includes a safety shut off valve normally biased to a closed position and held in its open position by an electromagnet energized by a thermoelectric circuit responding to a flame at the pilot burner, a limit switch for deenergizing the electromagnet in response to a predetermined limit condition and an indicator electrically connected to the limit switch to indicate that the predetermined limit condition was the cause of deenergization of the electromagnet.

---

This invention relates to a thermostatic control device and, in particular, to such a control device embodying a high limit cut off feature.

In modern heating appliances, such as domestic hot water heaters, it is standard practice to control a supply of fuel to a main burner and to a pilot burner, with the main burner flow being thermostatically controlled within a normal operating range and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube thermostat.

With the above arrangement, failure of the thermostatic valve means for any reason could result in tank explosions from dangerously high temperatures in the hot water tank. Accordingly, it is desirable to provide the control system with a high limit cut off feature responding to abnormal temperature conditions in the water tank. The high limit cut off feature is incorporated in the thermoelectric safety device, which thus requires reset in response to two separate conditions, one being the extinguishment of the flame at the pilot burner and the other being the occurrence of an abnormal temperature condition.

It is important to know which of the two conditions caused the shutdown. For instance, if the shutdown occurred because of an abnormal temperature condition, it is desirable to correct the cause which brought about such condition before resetting the control system.

It is, therefore, an object of this invention to indicate the condition causing shutdown in a control system responding to a plurality of shutdown conditions.

Another object of the present invention is to provide a dual safety, thermostatic control device with an indicator to identify which of the two conditions caused actuation of the dual safety mechanism.

The present invention has another object in that a high resistance indicator is electrically connected in parallel with the low resistance limit switch and the low resistance safety operator of a dual safety control device.

The present invention has another object in that a high resistance indicator is directly connected in parallel across the limit switch of a dual safety control device.

A further object of the present invention is to construct a simple, economical, unitary assembly including an indicator in a dual safety, thermostatic control device.

In practicing the present invention, a control system for burner apparatus includes safety shut off means movable between open and closed positions, electromagnet means energizable for holding the safety shut off means in its open position, thermoelectric circuit means electrically connected to the electromagnetic means for energization thereof, limit switch means electrically connected to the electromagnetic means for deenergizing the same in response to a predetermined limit condition, and indicator means electrically connected to the limit switch to indicate the predetermined limit condition which caused deenergization of the electromagnetic means.

Other objects and advantages of the present invention will become apparent from the following description taken in connection with the accompanying drawing wherein:

FIG. 1 is a schematic diagram of a fuel burner control system embodying the present invention;

FIG. 2 is a schematic diagram similar to FIG. 1 but showing a different controlling position of the components;

FIG. 3 is a schematic diagram similar to FIGS. 1 and 2 but showing another different controlling position of the components; and FIG. 4 is a schematic diagram similar to FIG. 1 but showing a modified arrangement.

While the present invention may be applicable to various types of control devices and various types of heating appliances and may be utilized in connection with electrical heating elements as well as gaseous fuel burning heater elements, it will be described in connection with a fuel burner control system for a hot water heater.

As is illustrated in FIG. 1, the present invention is embodied in a control device including a casing, indicated generally at 10, having an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 that is controlled by a manually operable on-off valve 26 and a thermostatically operated valve 28, which valves are upstream of a main flow outlet port 30 that communicates with a conduit 32 for supplying fuel to a main burner 34.

The pilot flow passage 16 communicates with the common passage 14 intermediate its opposite ends which define upstream and downstream valve seats. The downstream valve seat 36 is controlled by combined reset and valve means which includes a valve member 38 carried adjacent one end of a reset stem 40. The upper end of the stem 40 extends through a sealing collar 42 on a plunger housing 44, in which a coil spring 46 encircles the stem 40 and is mounted in compression between the collar 42 and a disc 48 on the end of the stem 40. The stem 40 is retained in the housing 44 by means of a hollow push button 50 which receives the stem disc 48 and which includes an annular bottom flange 52 engaging the housing wall surrounding an opening therefor.

The upstream valve seat 54 is controlled by an electromagnetic device, indicated generally at 56, having a safety shut-off valve member 58 movably disposed for cooperation with the valve seat 54. The valve member 58 is fixed to one end of an armature stem 60 which has its other end fixed to an armature 62 located in a fixed magnet housing 64 so that the stem 60 is slidably disposed relative to the housing 64. A coil spring 68 surrounds one end of the armature stem 60 and is mounted in compression between the top end wall of the magnet housing 64 and the rear surface of the valve member 58 which is thus biased to a closed position against the valve seat 54. The valve member 58, stem 60 and armature 62 reciprocate as a unit between released and attracted positions relative to fixed electromagnetic means in the form of a generally U-shaped magnet core 70 and an electric coil 72 wound thereon. One end of electric coil 72 is connected to a ground terminal 74 and the other end is connected to an electrical conductor 76.

As is shown in FIG. 1, the bottom end wall of the magnet housing 64 is defined by support means in the form of a magnet base 78 having external threads so that the entire assembly 56 may be threaded into a suitable opening in the casing 10. In order to prevent any fuel leakage from such opening, the threads are provided with a sealing compound and a tapered sealing lip 80 on the periphery of the magnet base 78 has a seal tight relationship with the periphery of such opening.

The conductor 76 extends through the top portion of the base 78 and has a concave surface disposed in the upper part of a cavity formed in the bottom portion of the base 78. A hexagonal periphery 82 on the exterior of the base bottom portion receives a wrench or tool for tightening the assembly 56 in the threaded opening of the casing 10. The bottom of base 78 has a threaded opening 84 which receives a thermocouple cable connector (not shown); a thermocouple lead 86 from one side of a thermocouple 88 extends to such connector and the other side of the thermocouple 88 is connected to the ground terminal 90. The thermocouple 88 is mounted in the proximity of the pilot burner 22 so as to be heated from the flame thereof.

The bottom of base 78 is provided with a suitable side opening permitting the insertion of lead wires therein. Thus, the thermocouple connector defines a common junction 92 to which one end of the lead wire 94 is connected; the other end of lead wire 94 is connected to the fixed contact 96 of a thermostatic switch 95 which may be of any suitable type, such a bimetal switch. The switch 95 is calibrated to respond to a predetermined abnormal temperature condition and thus defines a limit switch operable at a higher temperature than that of the normal temperature responsive thermostatic valve 28. The switch 95 also includes a movable contact 98 connected to one end of a lead wire 100 whose other end is connected to the conductor 76 for the magnet coil 72.

A second wire lead 102 from the common junction 92 is connected to one end of a coil 104 of an electric operator for an indicator device; the other end of coil 104 is connected to a ground terminal 106. The coil 104 is wound around a core 108 which when energized attracts an armature 110. The armature 110 is in the form of a lever centrally mounted on a pivot pin 112 with one end disposed adjacent core 108 and the other end attached to a tension coil spring 114. Opposite the tension coil spring 114, the lever 110 is disposed for engagement with a push button indicator 116 that is movable to an indicating position when the lever 110 is attracted to the core 108. A detent 118 on the indicator button 116 cooperates with a collar 120 surrounding an opening in the casing 10 to retain the button 116 in its last placed position; thus manual reset of the button 116 is required even though the coil 104 is deenergized.

Other suitable arrangements requiring reset of the button 116 may be utilized such as an overcenter mechanism.

The particular sequence of operation of the above circuitry will be described in detail in connection with the following description of the overall operation of the control device. To place the system of FIG. 1 in operation, the manual valve 26 is rotated to an on position and temperature setting means (not shown) for the thermostatically operated valve is moved to a selected temperature, e.g., 140° F. for conventional domestic hot water heaters. The reset button 50 is manually depressed whereby the valve member 38 is closed on valve seat 36 to prevent any fuel flow through the main flow passage 24 during lighting and whereby the lower end of the reset stem 40 moves the valve member 58, stem 60 and armature 62 as a unit against the bias of coil spring 68 to an attracted or valve open position permitting a fuel flow through the pilot flow passage 16 to the pilot burner 22 where it is ignited as by a match. As soon as the thermocouple 88 is heated sufficiently by the pilot burner flame to energize the holding electromagnetic means, core 70 and coil 72, the push button may be released whereupon the armature 62 is held in its attracted position and both valve seats 36 and 54 are open. Inasmuch as the thermostatically operated valve 28 is open, fuel flows to the main burner 34 which is ignited by the flame of the pilot burner 22.

When the water temperature reaches the selected temperature, the valve 28 is closed and the main fuel flow is cut off and the main burner 34 is extinguished. A subsequent decrease in the water temperature, as when the hot water is drawn off and replenished with cold water, causes the valve 28 to be opened again. During normal operation the main burner 34 will be cycled thermostatically as outlined above to maintain the water temperature at 140° F.

The dual safety features for the control device include the low resistance magnet coil 72 and the low resistance limit switch 95; in this particular circuitry the magnet coil 72 and limit switch 95 are connected in series and the high resistance indicator coil 104 is connected in parallel therewith. Thus, under normal operating conditions, as is illustrated in FIG. 1, the limit switch 95 is closed and the high limit indicator is not actuated because the relatively low resistance limit switch 95 and magnet coil 72 receive the major portion of the thermoelectric current, while the relatively high resistance coil 104 does not receive enough current to actuate its core 108 and armature 110.

FIG. 2 shows the relative positions of the components upon occurrence of only one of the conditions resulting in a safety shut down, i.e., pilot burner outage. Extinguishment of the flame at the pilot burner 22 results in cooling of the thermocouple 88. The voltage and current decay resulting from the loss of thermoelectric power causes deenergization of the magnet coil 72; obviously, the parallel connected high resistance coil 104 will remain deenergized so there is no actuation of the limit indicator 116. Deenergization of the magnet coil 72 releases the armature 62 from the magnet core 70 under the bias of the coil spring 68, which closes the valve member 58 on the valve seat 54 to effect 100% shut off of any fuel flow. In order to place the system in operation again, the resetting procedure outlined above must be repeated.

In this particular burner control system, the thermostatic switch 95 functions as a high thermal limit control to prevent an excessively high temperature that could cause explosion of the hot water tank. In the event the water temperature increases to a dangerously high temperature, e.g., in the range above 190° F., due to some malfunction which keeps the main burner in operation, the limit switch 95 will open. Such a condition is illustrated in FIG. 3 wherein opening of the limit switch 95 simultaneously deenergizes the magnet coil 72 and diverts the total thermoelectric voltage to the indicator coil 104. This total voltage is sufficient to energize the high resistance coil 104 whereupon the armature lever 110 is attracted to the core 108 and the indicator button 116 is moved to its indicating position. The outward movement of the button 116 is limited by any suitable stop means (not shown), such as another detent. Since the pilot burner 22 is now shut off, the thermocouple 88 will subsequently cool, after which the indicator coil 104 is deenergized and the armature lever 110 returns under the bias of tension spring 114 to its original position. However, the indicator button 116 remains as shown in FIG. 3 because of its manual reset requirement, in this case the detent 118. Thus, the indicator button 116 indicates that the shut down has occurred by operation of the limit switch 95 and was not due to an initial pilot outage condition.

FIG. 4 illustrates a modification of the control device of FIGS. 1, 2 and 3 in that the electric operator for the high limit indicator is connected directly in parallel across the limit switch. Thus, a lead 202 from the switch lead 100 is connected to one end of the indicator coil 204, the other end of which is connected to a lead 205 from the other switch lead 94. The remaining elements of FIG. 4 are substantially the same as those described in connection with FIG. 1 so a detailed description is deemed unnecessary here.

Under normal conditions, the low resistance limit switch 95 of FIG. 4 is closed and the serially connected magnet coil 72 is energized or deenergized in accordance with operation of the pilot burner 22 as discussed above. The FIG. 4 arrangement has the additional advantage of slightly lowering the circuit resistance through the magnet coil 72 under normal operation conditions. Since the release of the safety armature 62 is not simultaneous with pilot burner outage but is delayed until the thermocouple 88 is cooled sufficiently to reduce the thermoelectric current, the added resistance of the indicator coil 204 accelerates the reduction of the thermoelectric current so that the safety armature 62 will drop out quicker.

When the limit switch 95 of FIG. 4 is opened, the indicator coil 204 is placed in direct series connection with the magnet coil 72, whereupon the indicator coil 204 is energized and the magnet coil 72 is deenergized. The indicator button 116 is then actuated as outlined above and the safety armature 62 drops out to effect 100% shut off of any fuel flow. To place the system in operation again, the resetting procedure must be repeated.

Inasmuch as the present invention is subject to many other modifications, variations and changes in details, it is intended that all matter contained in the foregoing description or shown in the accompanying drawing shall be interpreted as illustrative and not in a limiting sense.

What is claimed is:

1. In a control system for main and pilot burner apparatus, the combination comprising,
safety shut off means movable between open and closed positions,
biasing means normally biasing said safety shut off means to its closed position,
electromagnetic means adapted to be energized for holding said safety shut off means in its open position,
thermoelectric circuit means electrically connected to said electromagnetic means for energizing the same,
limit switch means electrically connected to said electromagnetic means for deenergizing the same in response to a predetermined limit condition, and
indicator means electrically connected to said thermoelectric circuit means and to said limit switch means to indicate the predetermined limit condition which caused deenergization of said electromagnetic means, said indicator means comprising an electromagnetic operator having a higher resistance than said limit switch means and than said electromagnetic means whereby actuation of said limit switch means diverts the total current in said thermoelectric circuit means to said electromagnetic operator.

2. The invention as recited in claim 1 wherein said electric operator is electrically connected in parallel with said limit switch means and said electromagnetic means.

3. The invention as recited in claim 1 wherein said electric operator is electrically connected directly in parallel across said limit switch means.

4. The invention as recited in claim 1 wherein said limit switch means comprises a normally closed switch in series with said thermoelectric circuit means.

5. The invention as recited in claim 1 wherein said indicator means includes a reset button movable to an indicating position upon energization of said electric operator.

6. The invention as recited in claim 5 wherein said reset button includes detent means for retaining the same in its indicating position whereby said reset button requires manual resetting.

References Cited
UNITED STATES PATENTS

| | | | |
|---|---|---|---|
| 2,290,049 | 7/1942 | Hildebrecht | 158—130 X |
| 2,734,564 | 2/1956 | Ray | 158—130 |
| 2,751,975 | 6/1956 | Matthews | 158—122 |

FREDERICK L. MATTESON, JR., *Primary Examiner.*

E. G. FAVORS, *Assistant Examiner.*